US009759271B2

(12) United States Patent
Hedman (10) Patent No.: US 9,759,271 B2
(45) Date of Patent: Sep. 12, 2017

(54) DRY-PLATE CLUTCH FOR A VEHICLE TRANSMISSION (71) Applicant: VOLVO TRUCK CORPORATION, Göteborg (SE)

(72) Inventor: Anders Hedman, Marstrand (SE)

(73) Assignee: Volvo Truck Corporation, Göteborg (SE)

(*) Notice: Subject to any disclaimer, the term of this patent is extended or adjusted under 35 U.S.C. 154(b) by 58 days.

(21) Appl. No.: 14/417,178

(22) PCT Filed: Sep. 3, 2013

(86) PCT No.: PCT/EP2013/002637
§ 371 (c)(1),
(2) Date: Jan. 26, 2015

(87) PCT Pub. No.: WO2014/037098
PCT Pub. Date: Mar. 13, 2014

(65) Prior Publication Data
US 2015/0211584 A1    Jul. 30, 2015

Related U.S. Application Data (60) Provisional application No. 61/696,338, filed on Sep. 4, 2012.

(51) Int. Cl.
*F16D 13/72*    (2006.01)
*F16D 13/52*    (2006.01)
(Continued)

(52) U.S. Cl.
CPC ............ *F16D 13/72* (2013.01); *F16D 13/52* (2013.01); *F16D 13/70* (2013.01); *F16D 13/71* (2013.01);
(Continued)

(58) Field of Classification Search
None
See application file for complete search history.

(56) References Cited

U.S. PATENT DOCUMENTS 4,556,133 A    12/1985 Huber
5,855,267 A *  1/1999 Giroire ................... F16D 13/58
                                         192/70.27

(Continued)

FOREIGN PATENT DOCUMENTS

CN    10122867    7/2008
CN    19122887    7/2008
(Continued)

OTHER PUBLICATIONS

International Search Report (Dec. 3, 2013) for corresponding International App. PCT/EP2013/002637.
(Continued)

*Primary Examiner* — Jacob S Scott
*Assistant Examiner* — Timothy M Hannon
(74) *Attorney, Agent, or Firm* — WRB-IP LLP (57) ABSTRACT A dry-plate clutch (single or dual) of inverted construction for a vehicle transmission includes a clutch structure with a connecting device arranged to be connected to a prime mover; a pressure plate rotationally fixed and axially displaceable relative to the clutch structure, and a driven disc connected to a driven shaft and located between the clutch structure and the pressure plate. An actuator is arranged to displace the pressure plate between an engaged state, where the driven disc is clamped between the clutch structure and the pressure plate, and a disengaged state, where the disc is rotatable relative to the clutch structure. The connecting device has hollow sections at a number of angular locations extending into a radial surface facing the pressure plate. The pressure plate has corresponding axially extending protrusions in a radial surface facing the connecting device; and
(Continued)

the protrusions at least partially extend axially into the hollow sections in the disengaged state.

8 Claims, 7 Drawing Sheets

(51) Int. Cl.
    *F16D 13/70* (2006.01)
    *F16D 13/71* (2006.01)
    *F16D 21/06* (2006.01)
    *F16D 25/08* (2006.01)

(52) U.S. Cl.
    CPC ........... *F16D 21/06* (2013.01); *F16D 25/087* (2013.01); *F16D 2021/0607* (2013.01); *F16D 2021/0669* (2013.01)

(56) References Cited

U.S. PATENT DOCUMENTS

2006/0289263 A1* 12/2006 Friedmann .............. F16D 13/58
    192/48.8
2009/0014270 A1* 1/2009 Jordan .................... F16D 13/58
    192/70.22
2011/0132715 A1* 6/2011 Kimming ................ F16D 13/70
    192/66.3

FOREIGN PATENT DOCUMENTS

| | | |
|---|---|---|
| DE | 10018646 A1 | 10/2001 |
| DE | 10220205 A1 | 11/2002 |
| DE | 10304502 A1 | 4/2004 |
| EP | 1302687 A2 | 4/2003 |
| FR | 1036741 A * 9/1953 ............. F16D 21/06 |
| FR | 2810706 A1 | 12/2001 |
| GB | 2125120 A | 2/1984 |
| GB | 2137291 A | 10/1984 |

OTHER PUBLICATIONS

International Preliminary on Patentability(Sep. 12, 2014) for corresponding International App. PCT/EP2013/002637.
Chinese Action (Jul. 26, 2016) from corresponding Chinese App. 21380046139.3.

* cited by examiner (Prior art)  Fig.1

DRY-PLATE CLUTCH FOR A VEHICLE TRANSMISSION

BACKGROUND AND SUMMARY

The present invention relates to vehicle powertrains, more particularly to a dry-plate clutch for a vehicle transmission having an improved combination of stiffness, strength and thermal capacity without increasing the installation space requirements for said dry plate clutch.

Dry plate clutches are used in manual and automated vehicle transmissions to facilitate start-off from rest and disengage the transmission from the engine at shifts. Particularly when starting off, heat will be generated in the sliding surfaces in contact as torque is being transferred during the transition from disengaged to fully engaged state. This heat is absorbed as a temperature increase of the parts in contact. The heat is then, in a rather slow way, conducted and radiated to the surrounding. Due to this slow heat dissipation, quite a large mass is required for absorbing the heat generated while keeping the temperature increase limited. Thus, dry plate clutches are relatively heavy. That requires a stiff and strong suspension in order to carry a dry plate clutch. Moreover, dry plate clutches are bulky, which may lead to conflicts with available installation space, especially in axial direction.

Dry plate clutches comprise a primary side, also referred to as the driving or input side, rotationally connected to an engine, and a secondary side also referred to as the driven or output side, that is rotationally connected to a transmission input shaft. In order to facilitate gear shifting, the secondary side, also referred to as the driven disc, has low inertia.

Therefore, the thermal mass is allocated to the primary side of the clutch. The primary side has an axially moveable clutch plate, referred to as the pressure plate that selectably can clamp and release the driven disc for engaging and disengaging the clutch.

In general, the primary side is fixed to a prime mover, such as an engine flywheel. There are two basic types of construction of the primary side with respect to how the flywheel is used.

Most common is the construction where the engine flywheel has a friction surface facing the driven disc, and hence is a functional pan of the clutch. The pressure plate is located on the other side of the driven disc. An example of such an arrangement is shown in DE10304502A1. The mass of the flywheel is not only used for levelling out engine torque i0 fluctuations, but can also absorb heat generated in the clutch.

Less common, but still frequent, is the primary side construction where the engine flywheel has no other use for the clutch than to suspend it to, and transfer torque from, the engine crankshaft. Instead, the pressure plate faces the flywheel and crankshaft end. This will be referred to as "inverted construction" in the subsequent text. An example of a clutch with an inverted construction can be found in DE10220205A1. Inverted construction clutches are often used when the connection to the engine crankshaft is a sheet metal part. It is also common in dry plate clutches for dual clutch transmissions, e.g. as shown in DE10018646A1.

Normally, more axial space is needed when there is no clutch friction surface on the flywheel. That can lead to compromises between conflicting requirements. On one hand, there must be sufficient thermal mass for the pressure plate. On the other hand, sufficient strength and stiffness is required for the flywheel or the corresponding part that carries the clutch.

Consequently, there is a need for an axially compact dry plate clutch of inverted construction that enables high thermal mass of the pressure plate as well as high strength and stiffness of the device that connects the primary side of the clutch to the engine crankshaft. It is desirable to provide an improved dry plate clutch of inverted construction that solves the above problems.

According to a preferred embodiment, an aspect of the invention relates to a dry-plate clutch of inverted construction in a vehicle transmission. The dry-plate clutch will be referred to as "the clutch" in the subsequent text. The clutch comprises a clutch structure with a connecting device drivingly connected to a prime mover. A pressure plate is rotationally fixed and axially displaceable relative to the clutch structure. A driven disc is connected to a driven shaft and is located between the clutch structure and the pressure plate. The clutch further comprises an actuator means arranged to displace the pressure plate between an engaged state, where the driven disc is clamped between the clutch structure and the pressure plate, and a disengaged state, where the disc is rotatable relative to the clutch structure. The actuator means can comprise any suitable device for actuating the clutch, such as a hydraulic or pneumatic cylinder or an electric motor.

The connecting device is provided with hollow sections, or recesses, at a number of angular locations extending into a radial surface facing the pressure plate. The pressure plate has corresponding axially extending protrusions in a radial surface facing the connecting device, which protrusions at least partially extend axially into the hollow sections in the disengaged state. The corresponding hollow sections and protrusions are located so that the rotational balance of the component parts is retained. For individual hollow sections and protrusions this requires two or more such features in the respective component.

According, to one example, the hollow sections can extend axially at least partially through the connecting device. Alternatively, the hollow sections can extend axially fully through the connecting device.

The protrusions have a circular or oval cross-section and can be equally distributed around the radial surface of the pressure plate. Alternatively, the protrusions have a rectangular, triangular or trapezoidal cross-section. The protrusions can be arranged as two identical protrusions at opposite sides of the rotational axis and at the same radius from this axis. Alternatively, multiple protrusions can be equally distributed around the face of the pressure plate. The protrusions can have the same or different sizes and be arranged on the same or at different radii.

The protrusions can also have a honeycomb cross-section, wherein they can be provided as a pattern over an annular section of the pressure plate where it faces the connecting device.

According to a further example, the protrusions can comprise two or more ring segments. Such ring segments can have an intermittent annular cross-section, wherein the interrupted sections allow for radial reinforced portions between adjacent recesses in the connecting device. The protrusions can be arranged as a single ring or as concentric rings.

The connecting device with its hollow sections can comprise a cast component. Manufacturing the connecting device as a cast part with the hollow sections formed in the casting process, enables cost-effective production. Alternatively it can comprise a metal sheet component with cut-out sections, e.g. by blanking. Manufacturing the connecting device as a sheet metal part were the hollow sections are cut out also enables cost-effective production.

Alternatively, the invention relates to a dual dry plate clutch in a vehicle transmission. The dual clutch transmission comprises a clutch structure with a connecting device arranged to be drivingly connected to a prime mover. The prime mover can be an internal combustion engine or an electric motor. A first and a second pressure plate are rotationally fixed and axially displaceable relative to the clutch structure. A first and a second driven disc are connected to a first and a second driven shaft, respectively, and are located between the clutch structure and their respective pressure plate. A first and a second actuator means is arranged to displace their respective pressure plates alternately between a disengaged state and an engaged state, wherein one driven disc is clamped between the clutch structure and one pressure plate white the other driven disc is rotatable relative to the clutch structure and other pressure plate. The operation of dual clutch transmissions is well known in the art and will not be described in further detail. The dual clutch transmission comprises one dry-plate clutch according to the invention adjacent the connecting device, which clutch has been described above.

The invention further relates to a vehicle provided with a transmission comprising a dry-plate clutch as described above.

BRIEF DESCRIPTION OF THE DRAWINGS

In the following text, the invention will be described in detail with reference to the attached drawings. These schematic drawings are used for illustration only and do not in any way limit the scope of the invention. In the drawings:

FIG. 4b shows an axial view of the clutch of FIG. 4a;

DETAILED DESCRIPTION

Figure 1:
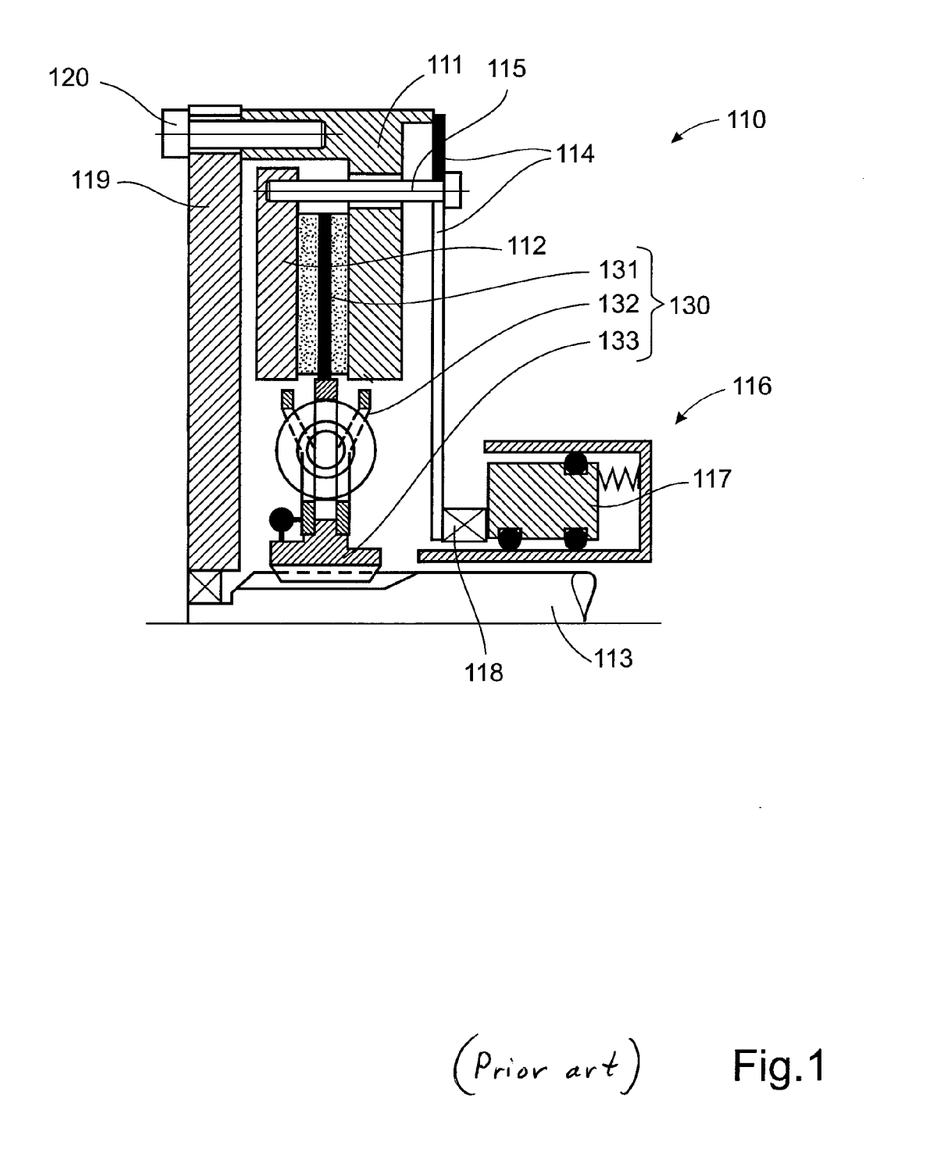
FIG. 1 shows a longitudinal section of a prior art dry plate clutch with inverted construction primary side.

FIG. 1 shows a schematic longitudinal section of a prior art single-disc dry plate clutch 110 of inverted construction. There, a clutch structure 111 is fastened to a connecting device 119, e.g., a flywheel, by means of screws 120. The connecting device 119 is rotationally connected to an engine crankshaft (not shown) A pressure plate 112 is rotationally connected to but axially moveable relative to the clutch structure 111. A driven disc 130 is arranged axially between the clutch structure 111 and pressure plate 112. The driven disc 130 is composed of a friction lining part 131, a damper unit 132, and a hub part 133 that is rotationally connected to and slidably arranged on a transmission input shaft 113. A diaphragm spring 114 is arranged at the right end of the clutch structure 111. A number of pull rods 115 are arranged around the circumference form an axial connection between the pressure plate 112 and diaphragm spring 114. In a not actuated state, the diaphragm spring 114 pulls the pressure plate 112 via pull rods 115 to the right, thus clamping the driven disc 130 to the clutch structure 111. Torque can then be transferred between the engine and transmission input shaft 118. The disengagement and engagement of the clutch 110 is performed by a clutch actuator 116. Therein, a piston 117 pushes, when energized, the innermost part of the diaphragm spring 114 to the left via a release bearing 118. That will release the pull rods 115 and pressure plate 112. The driven disc 130 is no longer clamped. This corresponds to disengaged state; the engine and transmission input shall 113 can rotate independent of each other.

In FIGS. 2-4b different modifications of the clutch 10 in FIG. 1 are shown. Several parts could be identical to parts in FIG. 1. Those parts are referred to by similar numbers. Corresponding parts have initial digits that correspond to the number of the FIG. 2, 3a, 4a, etc.), but the second and third digits are the same as in FIG. 1.

Figure 2:
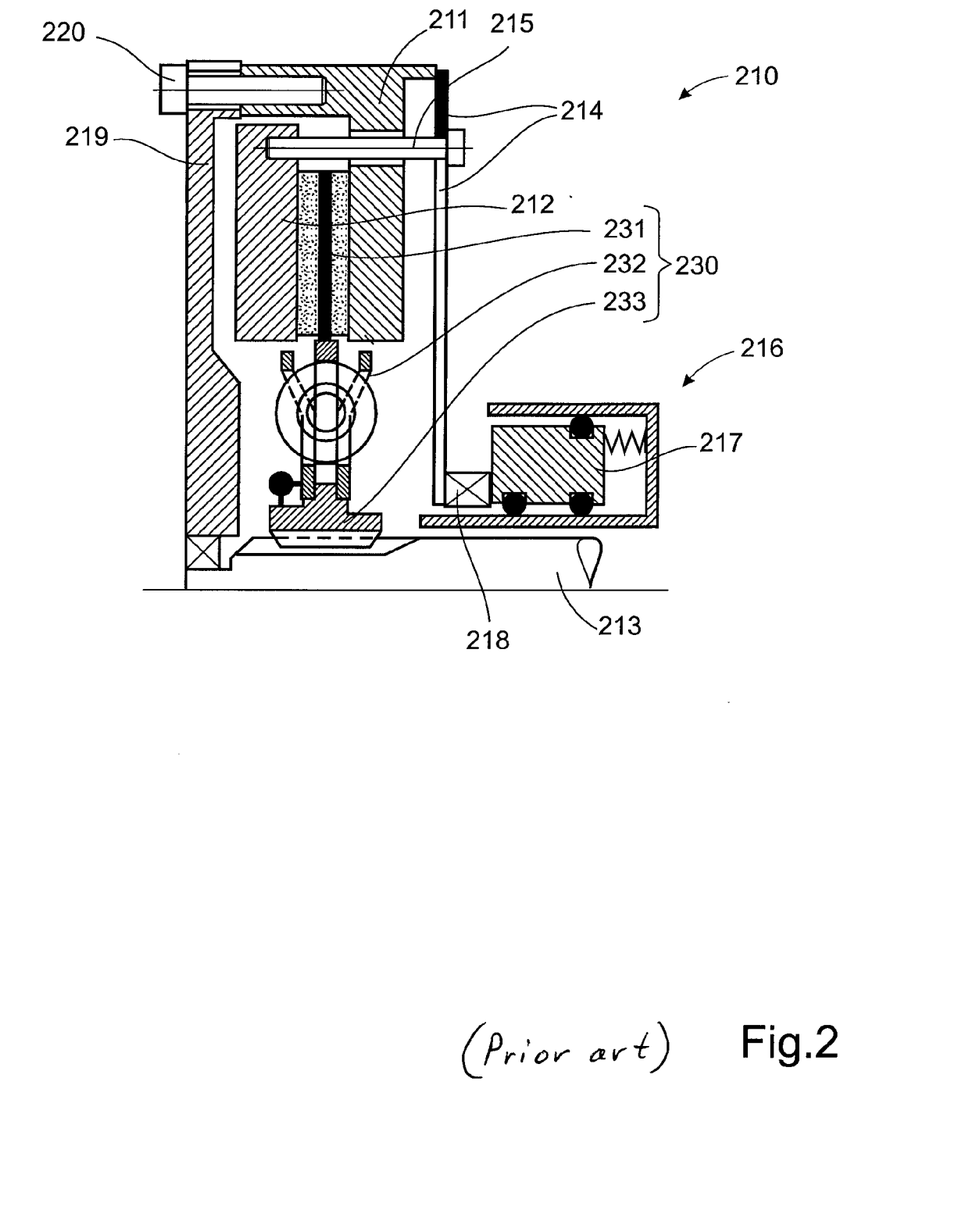
FIG. 2 shows a modified variant of the prior art clutch in FIG. 1 with increased pressure plate thickness but reduced thickness of the connecting device.

Consequently, FIG. 2 shows a schematic longitudinal section of a further prior art single-disc dry plate clutch 210 of inverted construction. There, a clutch structure 211 is fastened to a connecting device 219, e.g., a flywheel, by means of screws 220. The connecting device 219 is rotationally connected to an engine crankshaft (not shown). A pressure plate 212 is rotationally connected to but axially moveable relative to the clutch structure 211. A driven disc 230 is arranged axially between the clutch structure 211 and pressure plate 212. The driven disc 230 is composed of a friction lining part 231, a damper unit 232, and a hub part 233 that is rotationally connected to and slidably arranged on a transmission input shaft 213. A diaphragm spring 214 is arranged at the right end of the clutch structure 211. A number of pull rods 215 are arranged around the circumference form an axial connection between the pressure plate 212 and diaphragm spring 214. In a not actuated state, the diaphragm spring 214 pulls the pressure plate 212 via pull rods 215 to the right, thus clamping the driven disc 230 to the clutch structure 211. Torque can then be transferred between the engine and transmission input shaft 218. The disengagement and engagement of the clutch 210 is performed by a clutch actuator 216. Therein, a piston 217 pushes, when energized, the innermost part of the diaphragm spring 214 to the left via a release bearing 218. That will release the pull rods 215 and pressure plate 212. The driven disc 230 is no longer clamped. This corresponds to disengaged state; the engine and transmission input shaft 213 can rotate independent of each other.

In the clutch 110 in FIG. 1, the pressure plate 112 has a considerably lower mass than the clutch structure 111. The heat absorption capacity is correspondingly lower. If the axial space available is limited, an increase of the pressure plate mass could be embodied in a straightforward way by reducing the connecting device thickness around the whole circumference of the connecting device. This is shown in a modified clutch 210 in FIG. 2. A modified pressure plate 210 with increased thickness has required a modified connecting device 219 that has a correspondingly reduced thickness. A problem with this solution is that the reduction of thickness has a negative impact on the strength and stiffness of the connecting device 219.

The mass of an element is proportional to the width (circumference) and thickness. From solid mechanics it is well-known that bending strength is proportional to the width and to the square of the thickness. Moreover, bending stiffness is proportional to the width and to the third power of the thickness. Hence, a reduction in thickness has a larger impact on the strength and stiffness compared to the impact on weight. A width reduction has the same impact on weight as on strength and stiffness. So, with respect to strength and stiffness, it is more favourable to obtain a weight reduction by reduced width. For the connecting part 119 and 219 this can be interpreted as a dimension in circumferential direction. One advantageous way to embody this is to have hollow sections between solid sections with original or increased thickness.

Figure 3A:
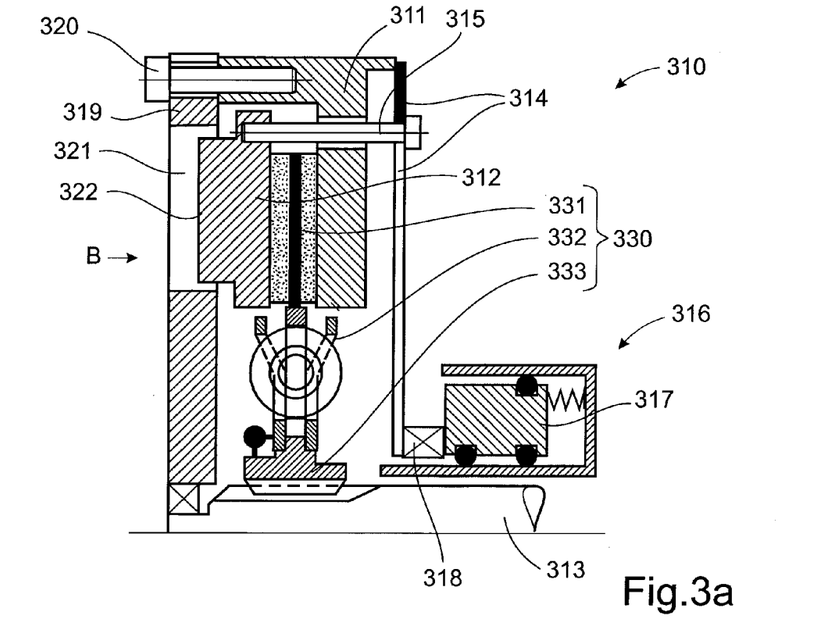
FIG. 3a shows a longitudinal section of a dry plate clutch with primary side of inverted construction having a hollowed connecting device according to the invention.
Figure 3B:
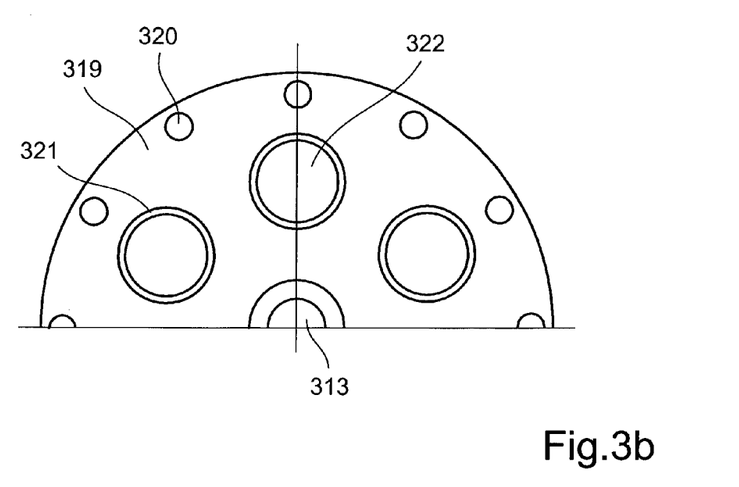
FIG. 3b shows an axial view of the clutch of FIG. 3b.

FIGS. 3a and 3b show a modified clutch 310 according to the invention. FIG. 3a shows a schematic longitudinal section of a single-disc dry plate clutch 310 of inverted construction. A clutch structure 311 is fastened to a connecting device 319, such as a flywheel, by means of screws 320. The connecting device 119 is rotationally connected to an engine crankshaft (not shown). A pressure plate 312 is rotationally connected to but axially moveable relative to the clutch structure 311. A driven disc 330 is arranged axially between the clutch structure 311 and pressure plate 312. The driven disc 330 is composed of a friction lining part 331, a damper unit 332, and a hub part 333 that is rotationally connected to and slidably arranged on a transmission input shaft 313. A diaphragm spring 314 is arranged at the right end of the clutch structure 311. A number of pull rods 315 are arranged around, the circumference form an axial connection between the pressure plate 312 and diaphragm spring 314. In a not actuated state, the diaphragm spring 314 pulls the pressure plate 312 via pull rods 315 to the right, towards the driven disc 330, thus clamping the driven disc 330 to the clutch structure 311. Torque can then be transferred between the engine and transmission input shaft 318. The disengagement and engagement of the clutch 310 is performed by a clutch actuator 316. Therein, a piston 317 pushes, when energized, the innermost part of the diaphragm spring 314 to the left via a release bearing 318. That will release the pull rods 315 and pressure plate 312. The driven disc 330 is no longer clamped. This corresponds to disengaged state; the engine and transmission input shaft 313 can rotate independent of each other.

The connecting device 319 has been modified in that it comprises hollow sections 321 at a number of angular locations. Furthermore, the pressure plate 312 has been modified to comprise protrusions 322 that extend, at least partly, into the hollow sections 321. Thereby, the thermal mass of the pressure plate 312 has been increased compared to the prior art clutch 110 in FIG. 1. This has been achieved in combination with less impact, on strength and stiffness of the connecting device 319 compared to the clutch 210 in FIG. 2.

FIG. 3b shows an axial view of the clutch 310 and connecting device 319 in the direction of the arrow "B" in FIG. 3a. It can be seen that there are hollow sections 321 and protrusions 322 at a number of angular locations. The solid sections between hollow sections 321 act as big spokes.

The hollow sections 321 extend through the connecting device 319. This can maximize the mass of the pressure plate 312. The ventilation around the pressure plate 312 can also be improved, which will improve the cooling of the clutch 310 and the ability to withstand repeated start-offs from rest. Utile connecting device 319 is embodied as a sheet metal part, hollow sections 32 can be cut out in a simple way by e.g. a blanking or stamping operation.

Blanking, is a specialized form of stamping, where there is no fracture zone when shearing. This is achieved by compressing the whole part and then an upper and a lower punch extract the blank. This allows the process to hold very tight tolerances, and perhaps eliminate secondary operations. Materials that can be blanked include aluminium, brass, copper, as well as carbon, alloy and stainless steels.

Blanking presses are similar to other metal stamping presses, but they have a few critical additional parts. A typical compound blanking press includes a hardened die punch (male), the hardened blanking die (female), and a guide plate of similar shape/size to the blanking die. The guide plate is the first applied to the material, impinging the material with a sharp protrusion or stinger around the perimeter of the die opening. Next a counter pressure is applied opposite the punch, and finally the die punch forces the material through the die opening. Since the guide plate holds the material so tightly, and since the counter pressure is applied, the material is cut in a manner more like extrusion than typical punching. Mechanical properties of the cut benefit similarly with a hardened layer at the cut edge of the part. Because the material is so tightly held and controlled in this setup, part flatness remains very true, distortion is nearly eliminated, and edge burr is minimal. Clearances between the die and punch are generally around 1% of the cut material thickness, which typically varies between 0.5-13 mm (0.020-0.51 in). Currently parts as thick as 19 mm (0.75 in) can be cut using blanking. Tolerances between ±0.0003-0.002 in (0.0076-0.051 mm) are possible based on material thickness and tensile strength, and part layout.

Figure 4A:
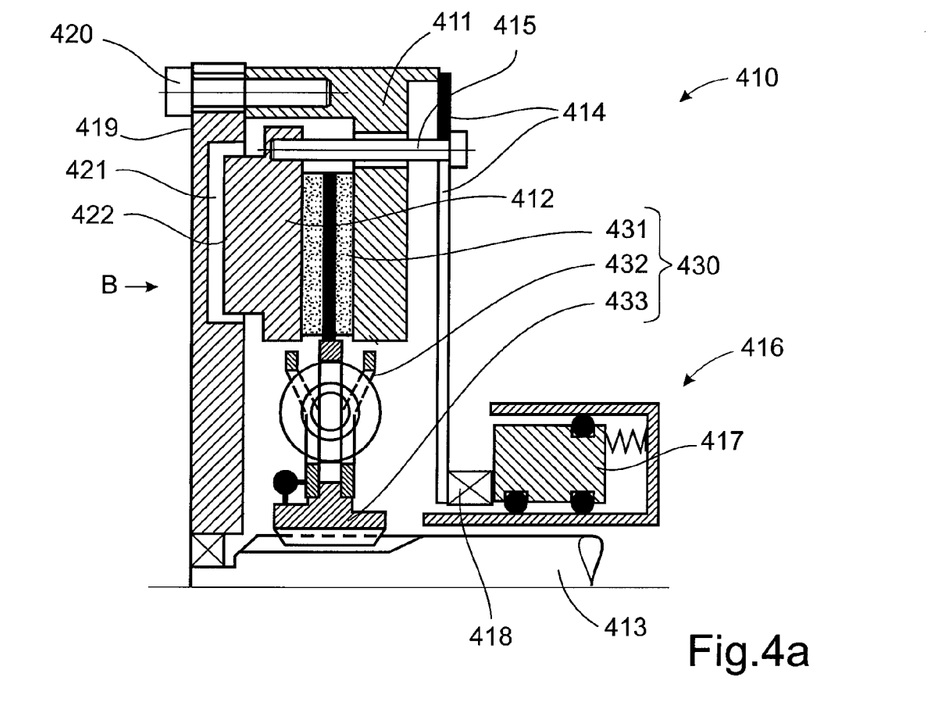
FIG. 4a shows a variant of the clutch in FIG. 3a where the hollow sections do not extend fully through the connecting device according to a preferred embodiment of the invention.
Figure 4B:
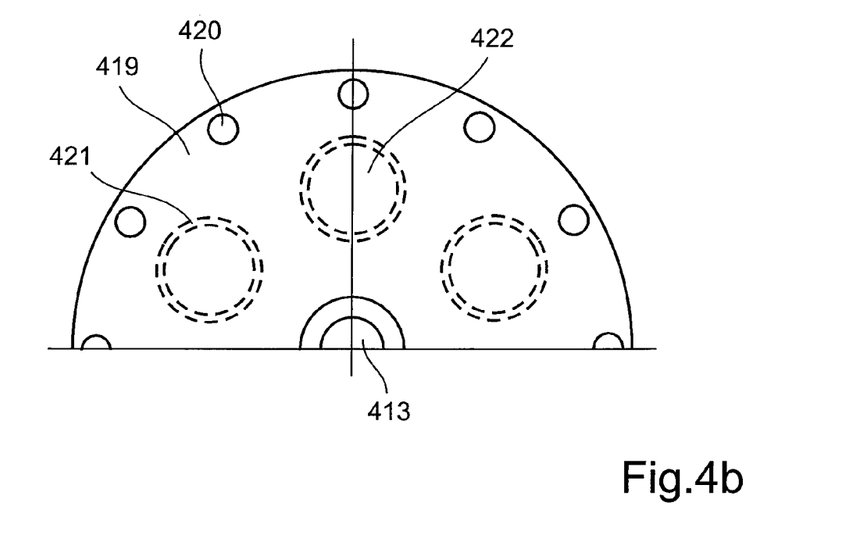

For some reasons it might sometimes be undesirable to have hollow sections extending, fully through the connecting device. Casting of the connecting device can be facilitated, and dust can be contained within the clutch. FIGS. 4a and 4b show an alternative modified clutch 410 according to the invention. FIG. 4a shows it schematic longitudinal section of a single-disc dry plate clutch 410 of inverted construction. A clutch structure 411 is fastened to a connecting device 419, such as a flywheel, by means of screws 420. The connecting device 419 is rotationally connected to an engine crankshaft (not shown). A pressure plate 412 is rotationally connected to but axially moveable relative to the clutch structure 411. A driven disc 430 is arranged axially between the clutch structure 411 and pressure plate 412. The driven disc 430 is composed of a friction lining part 431, a damper unit 432, and a hub part 433 that is rotationally connected to and slidably arranged on a transmission input shaft 413. A diaphragm spring 414 is arranged at the right end of the clutch structure 411. A number of pull rods 415 are arrange around the circumference form an axial connection between the pressure plate 412 and diaphragm spring 414. In a not actuated state, the diaphragm spring 414 pulls the pressure plate 412 via pull rods 415 to the right, towards the driven disc, 430, thus clamping the driven disc 430 to the clutch structure 411. Torque can then be transferred between the engine and transmission input shaft 418. The disengagement and engagement of the clutch 4 0 is performed by a clutch actuator 416. Therein, a piston 417 pushes, when energized, the innermost part of the diaphragm spring 414 to the left via a release bearing 418. That will release the pull rods 415 and pressure plate 412. The driven disc 430 is no longer clamped. This corresponds to disengaged state; the engine and transmission input shaft 413 can rotate independent of each other.

In this alternative modified clutch 410 the hollow sections 421 do not extend fully through the connecting device 419. Correspondingly, the protrusions 422 of the pressure plate 412 are smaller in height in order to avoid axial interference with the connecting device 419.

Figure 5:
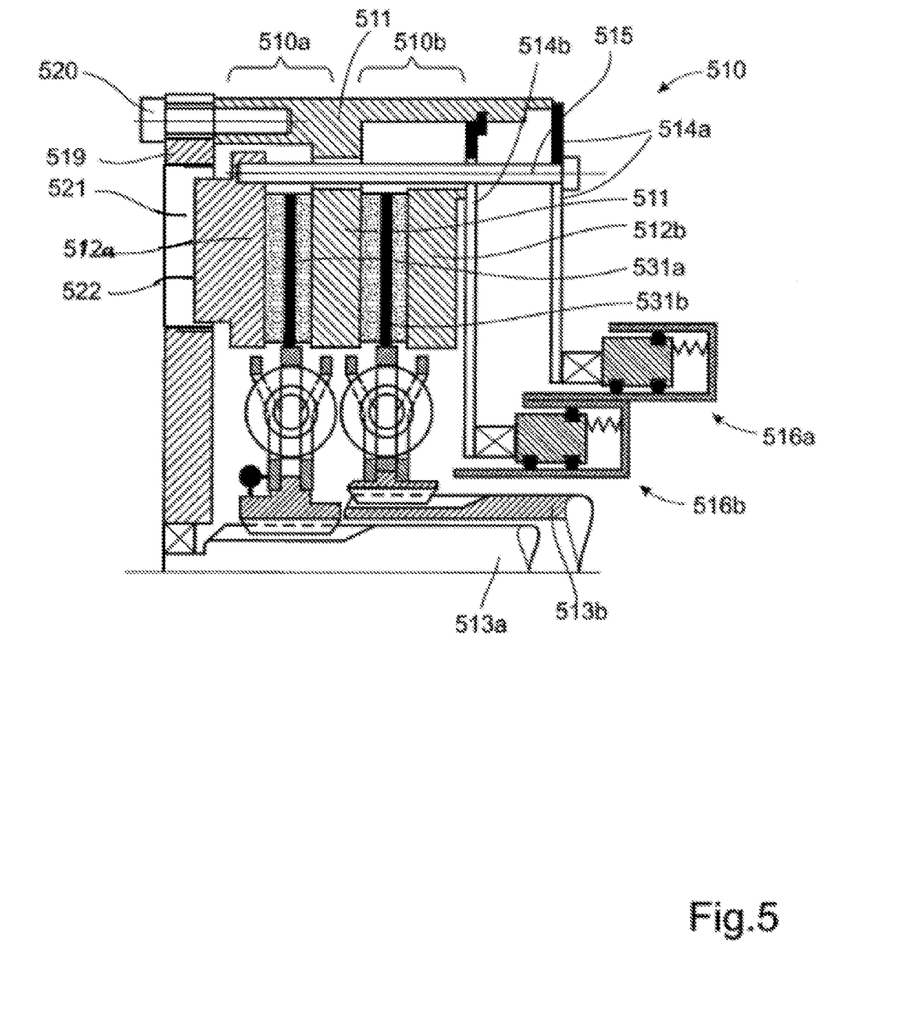
FIG. 5 shows a dry plate dual clutch where one clutch has inverted, construction primary side.

Dry plate clutches for dual clutch transmissions, e.g., as shown in DE10018646A1, tend to have relatively large overall axial extension. Hence, the invention should be particularly suited to such clutches. FIG. 5 shows a dry dual clutch 510 according to the invention. It comprises two clutches 510a and 510b with a common clutch structure 511. There are pressure plates 512a and 512b, driven discs 531a and 531b, diaphragm springs 514a and 514b, pull rod 515, and actuators 516a and 516b. The driven discs 531a and 531b are connected to transmission input shafts 513a and 513b respectively. The clutch structure 511 is fixed by means of screws 520 to connecting device 519 that has hollow sections 521. The pressure plate 512a has protrusions 522 that axially extend partially into the hollow sections 521. Said protrusions and hollow section are arranged at a number of angular locations. This makes the dual clutch 510 compact in axial direction. In one embodiment the hollow sections do not extend fully through the connecting device 519. In an alternative embodiment of the dry plate clutches for dual clutch transmissions shown in FIG. 5 the hollow sections 521 can extend fully through the connecting device.

Figure 6:
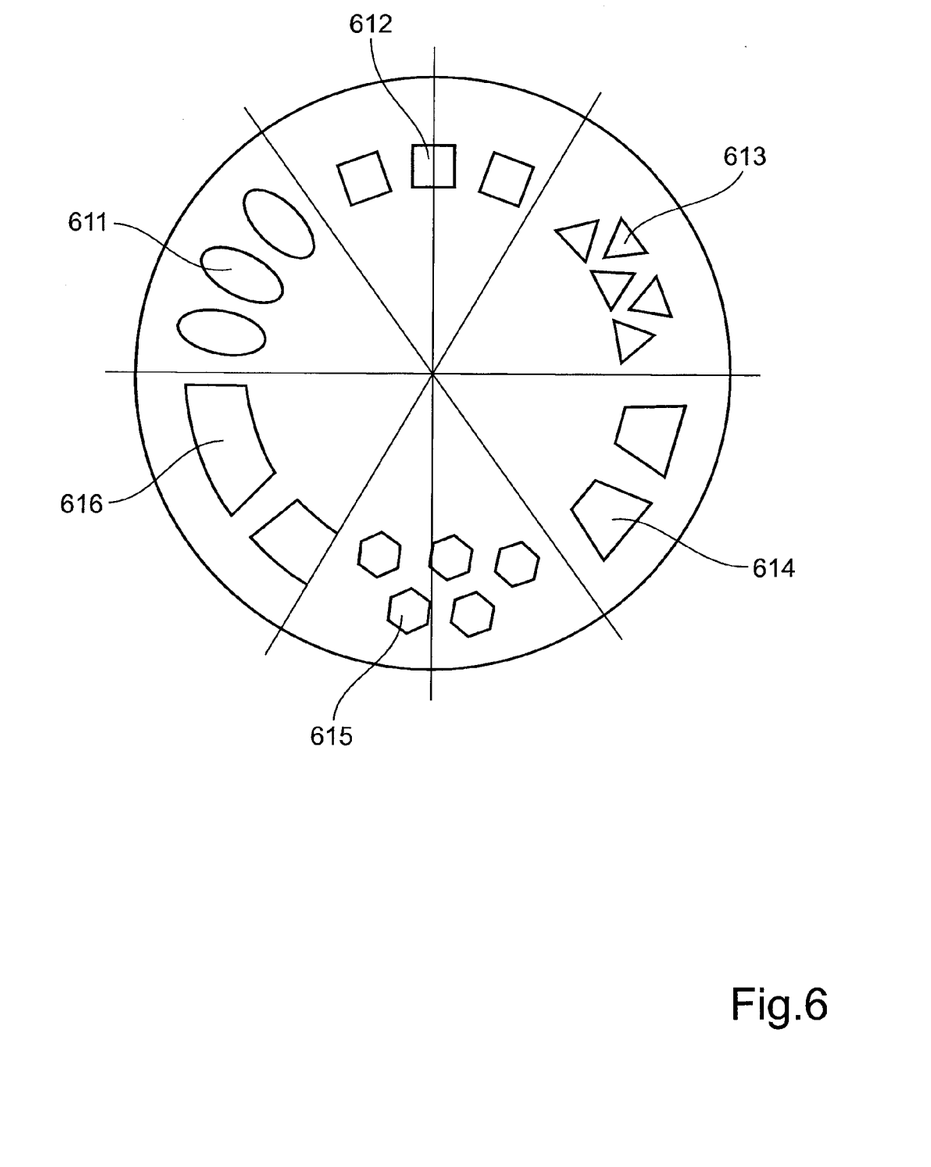
FIG. 6 shows a dry plate dual clutch where alternative examples of protrusions and their location is indicated.

FIG. 6 shows a dry dual clutch or single clutch where alternative examples of protrusions and their location are indicated. In the above FIGS. 3b and 4b, the connecting devices and the pressure plates have been describes as comprising cooperating circular protrusions. However, several variations and modifications are possible within what is covered by the claims, as will be apparent to persons skilled in the art. For instance, as indicated in FIG. 6, the hollow sections 321, 421, 521 and the corresponding protrusions 322, 422, 522 may have any suitable shape or pattern, e.g., circular as shown in FIGS. 3b and 4b), oval 611, rectangular 612, triangular 613, trapezoidal 614, honeycomb 615, or as multiple ring segments 616. The clutch structures 311, 411, 511 as well as the connecting devices 319, 419, 519 may be composed of several parts each.

Figure 7:
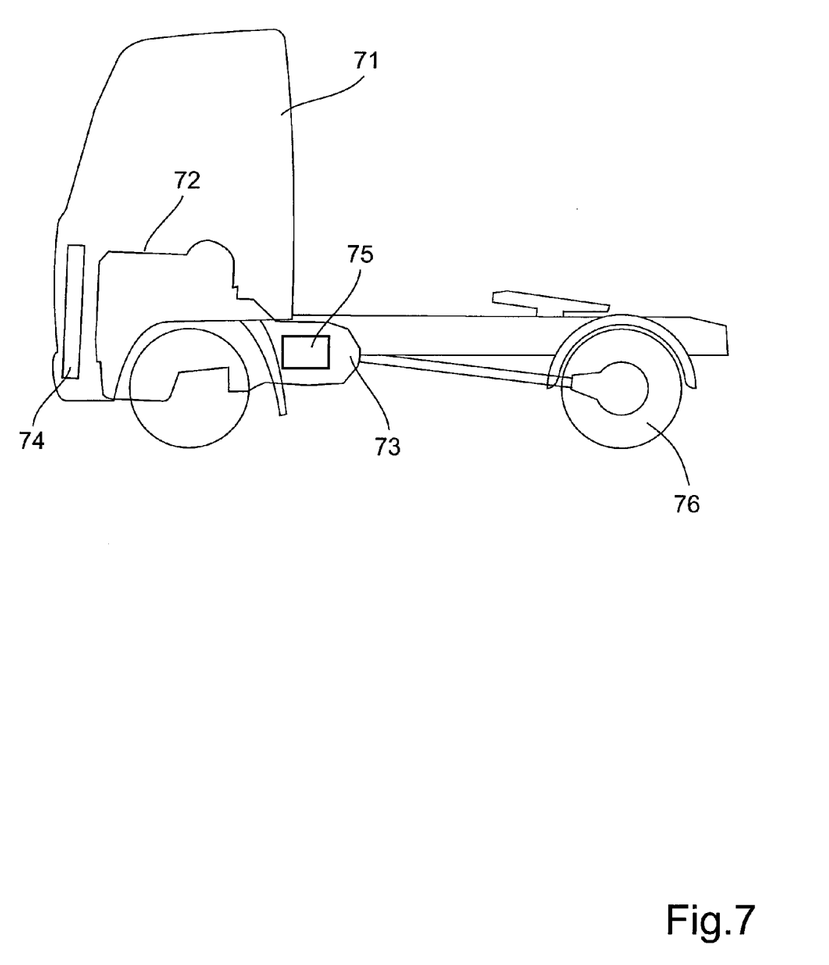
FIG. 7 shows a vehicle provided with a transmission according, to the invention.

FIG. 7 shows a schematically indicated vehicle 71 provided with a transmission comprising a dry-plate clutch according, to the invention. The vehicle 71 is provided with an internal combustion engine (ICE) 72 connected to a transmission 73, such as an automated manual transmission (AMT), fix transmitting torque to a vehicle drive axle (not shown). The AMT can comprise either a single (FIG. 3a or 4a) or a dual clutch (FIG. 5) arrangement (not shown). The ICE 72 is connected to a radiator arrangement 74 for cooling engine coolant and oil from the ICE 72. The transmission 11 is controlled by the driver or automatically via an electronic control unit (ECU) 75. The transmission is controlled to select a gear ratio between the engine 72 and a pair of driven wheels 76.

The invention should not be deemed to be limited to the embodiments described above, but rather a number of further variants and modifications are conceivable within the scope of the following patent claims. The connecting devices 319, 419, 519 may be drivingly connected upstream to the shaft of an electric motor or a gas turbine. Moreover, the clutch structures 311, 411, 511 as well as the connecting devices 319, 419, 519 may each comprise several component parts. Especially the single dry-plate clutch embodiments can be manually (via clutch pedal) or automatically (via an electronic control unit) controlled.

The invention claimed is:

1. A dual dry plate clutch for a transmission, comprising a clutch structure with a connecting device arranged to be drivingly connected to a prime mover, a first and a second pressure plate are rotationally fixed and axially displaceable relative to the clutch structure, a first and a second driven disc are connected to a first and a second driven shaft, respectively and are located between the clutch structure and their respective pressure plate, a first and a second actuator means is arranged to displace their respective pressure plates alternately between a disengaged state and an engaged state, wherein one driven disc is clamped between the clutch structure and one pressure plate while the other driven disc is rotatable relative to the clutch structure and other pressure plate, wherein the dual dry plate clutch comprises one dry-plate clutch adjacent the connecting device and the connecting device has hollow sections at a number of angular locations extending into a radial surface facing the pressure plate, the pressure plate has corresponding axially extending protrusions in a radial surface facing the connecting device, and the protrusions at least partially extend axially into the hollow sections in the disengaged state wherein the hollow sections extend axially fully through the connecting device wherein passage through the connecting device through the hollow sections is not blocked in either direction.

2. The dual dry plate clutch according to claim 1, wherein protrusions have a circular or oval cross-section.

3. The dual dry plate clutch according to claim 1, wherein the protrusions have a rectangular, triangular or trapezoidal cross-section.

4. The dual dry plate clutch according to claim 1, wherein the protrusions have a honeycomb cross-section.

5. The dual dry plate clutch according to claim 1, wherein the protrusions comprise two or more ring segments.

6. The dual dry plate clutch according to claim 1, wherein the connect device with the hollow sections comprises a cast component.

7. The dual dry plate clutch according to claim 1, wherein the connecting device with the hollow section comprises a blanked or stamped sheet metal component.

8. A vehicle provided with the transmission comprising the dry-plate clutch according to claim 1.

\* \* \* \* \*